Oct. 4, 1955 R. WALSH 2,719,487
LOCOMOTIVE FRAMING FOR SUPPORTING VENTILATION SYSTEM
Original Filed Sept. 2, 1949 16 Sheets-Sheet 4

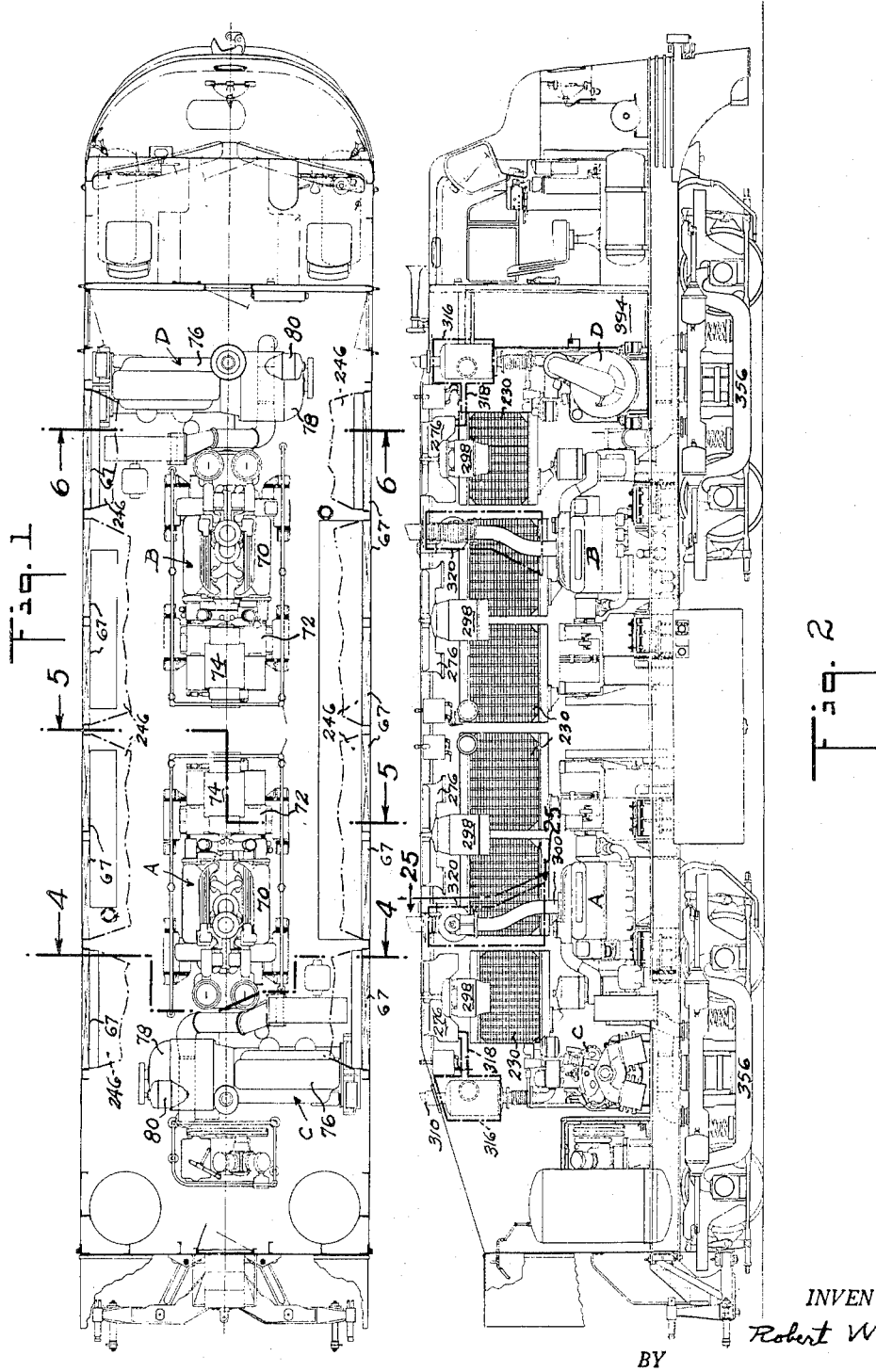

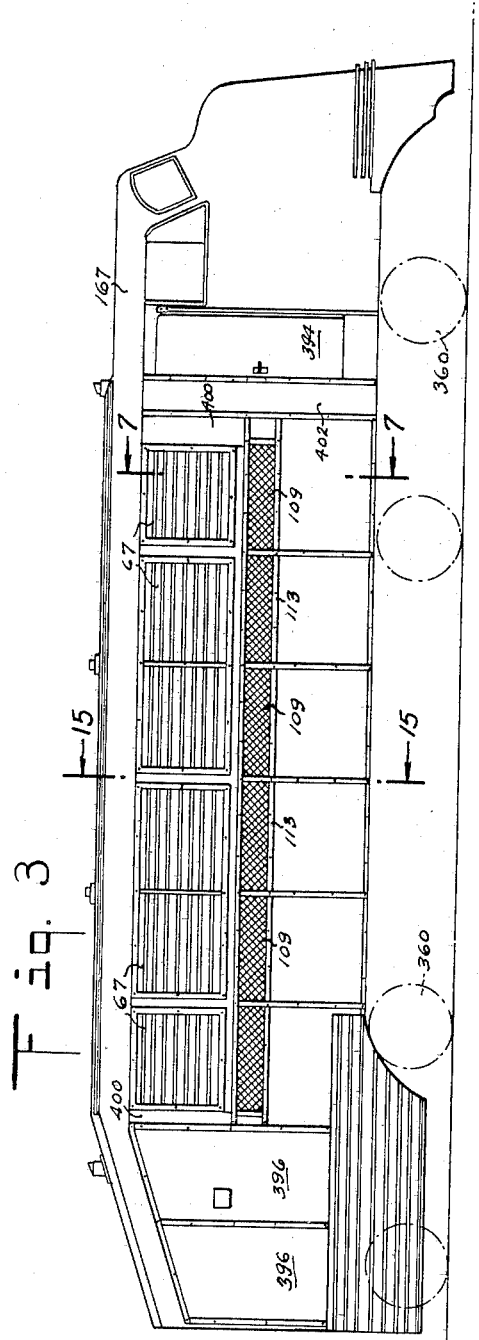

INVENTOR.
Robert Walsh
BY
George R. Ericson
ATTORNEY

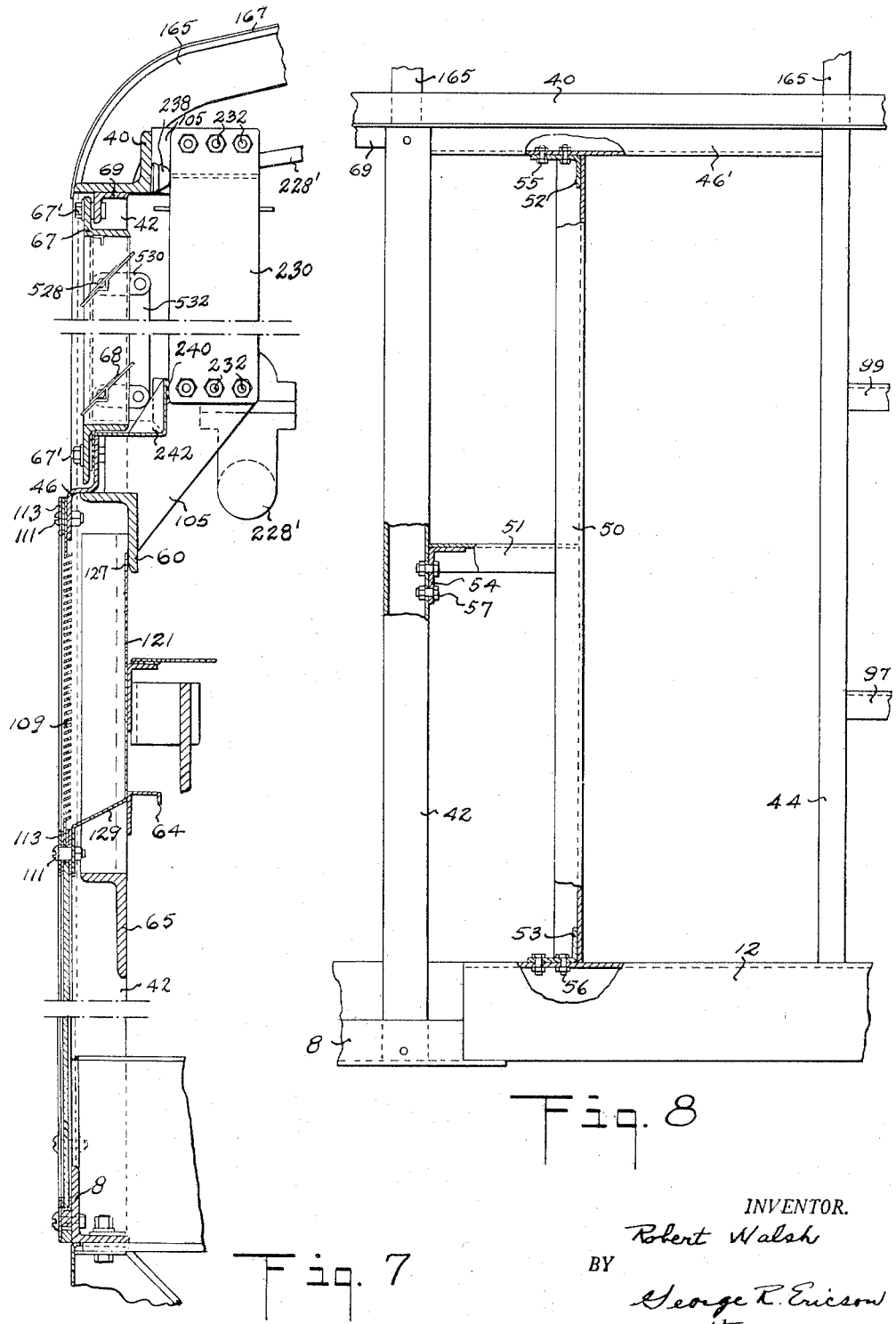

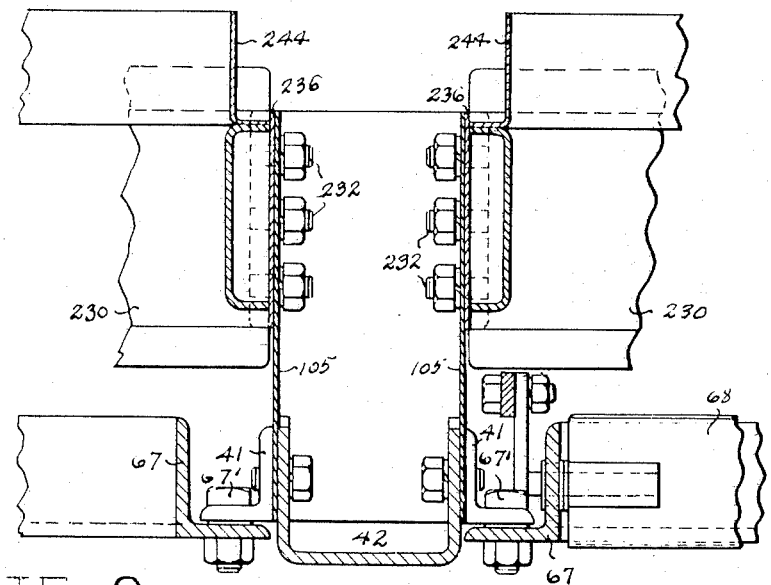
FIG_9
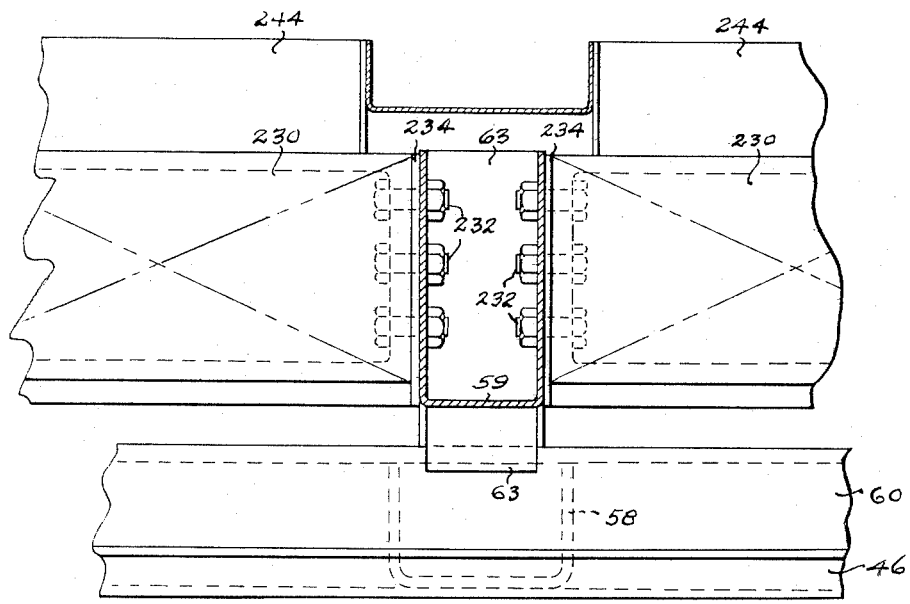
FIG_10

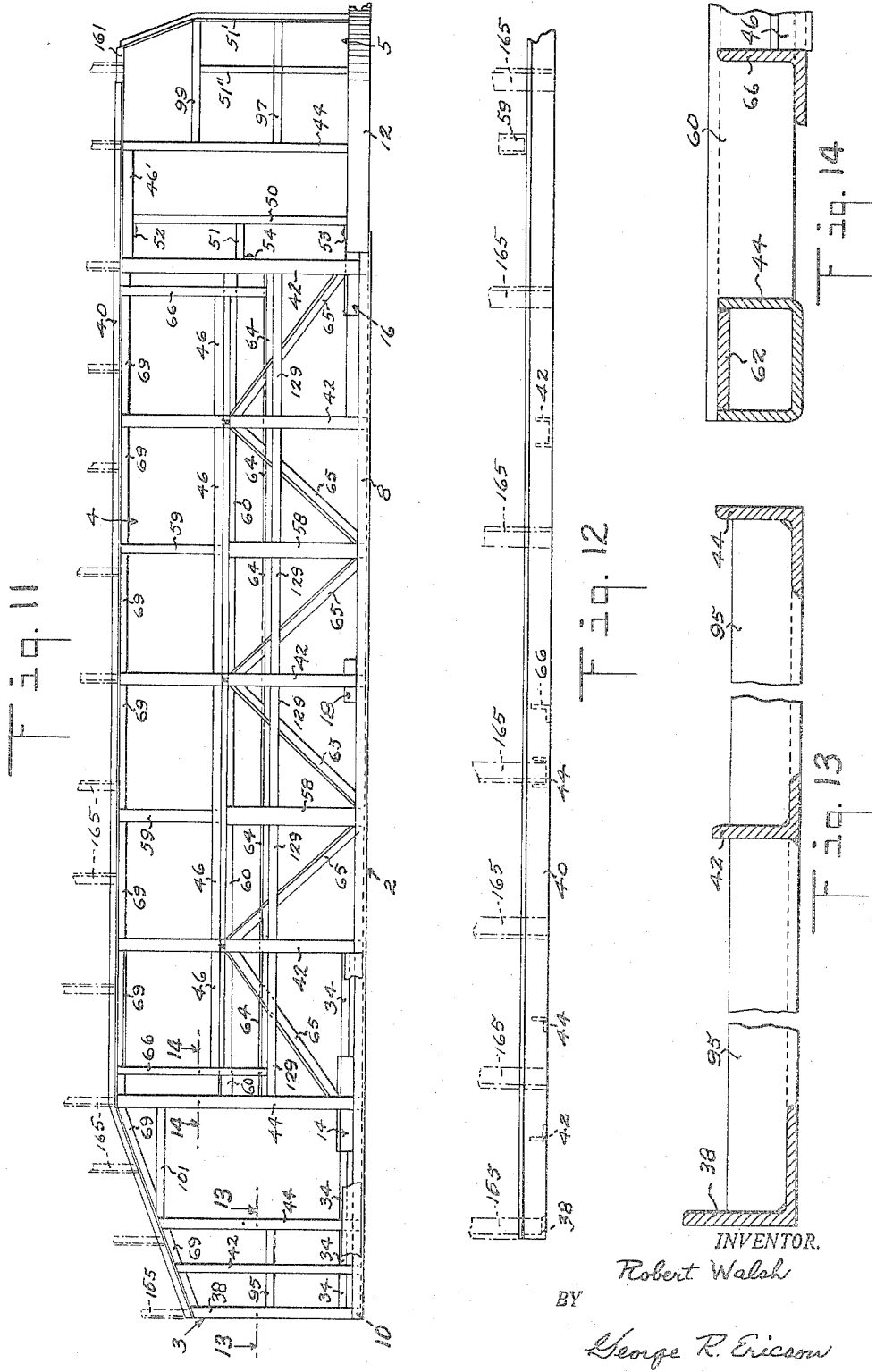

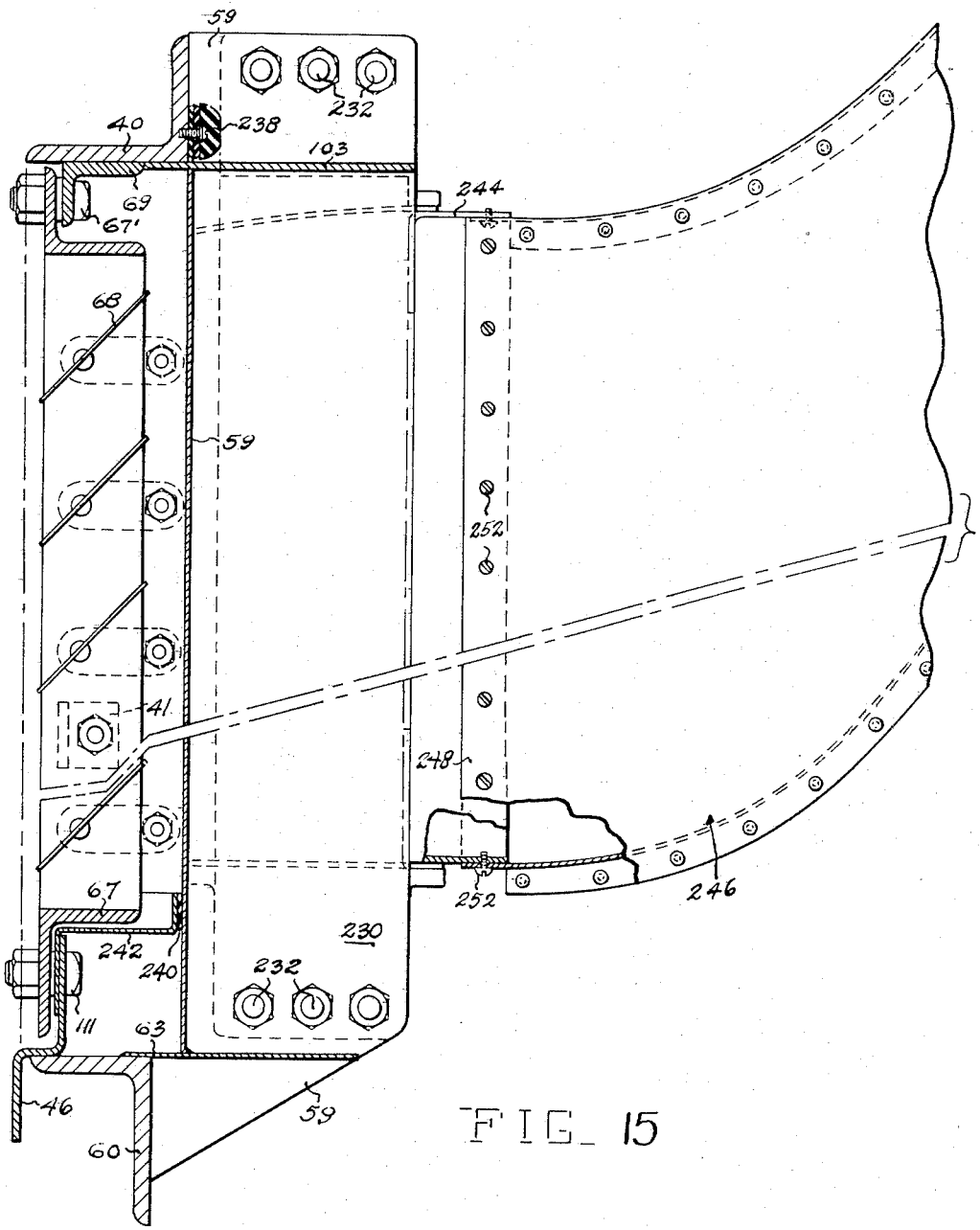

Oct. 4, 1955  R. WALSH  2,719,487
LOCOMOTIVE FRAMING FOR SUPPORTING VENTILATION SYSTEM
Original Filed Sept. 2, 1949  16 Sheets-Sheet 10
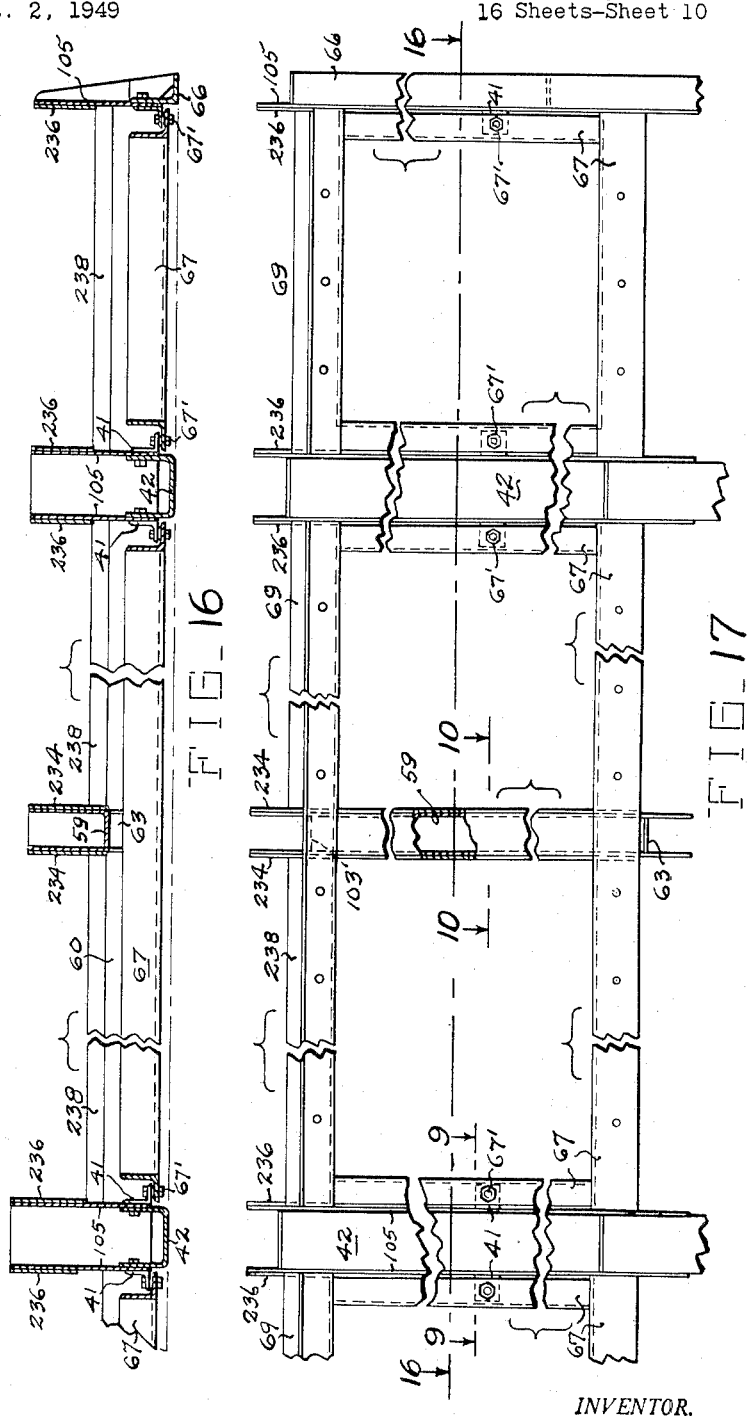
INVENTOR.
Robert Walsh
BY
George R. Ericson
ATTORNEY Oct. 4, 1955   R. WALSH   2,719,487
LOCOMOTIVE FRAMING FOR SUPPORTING VENTILATION SYSTEM
Original Filed Sept. 2, 1949   16 Sheets-Sheet 11

INVENTOR.
Robert Walsh
BY
George R. Ericson
ATTORNEY

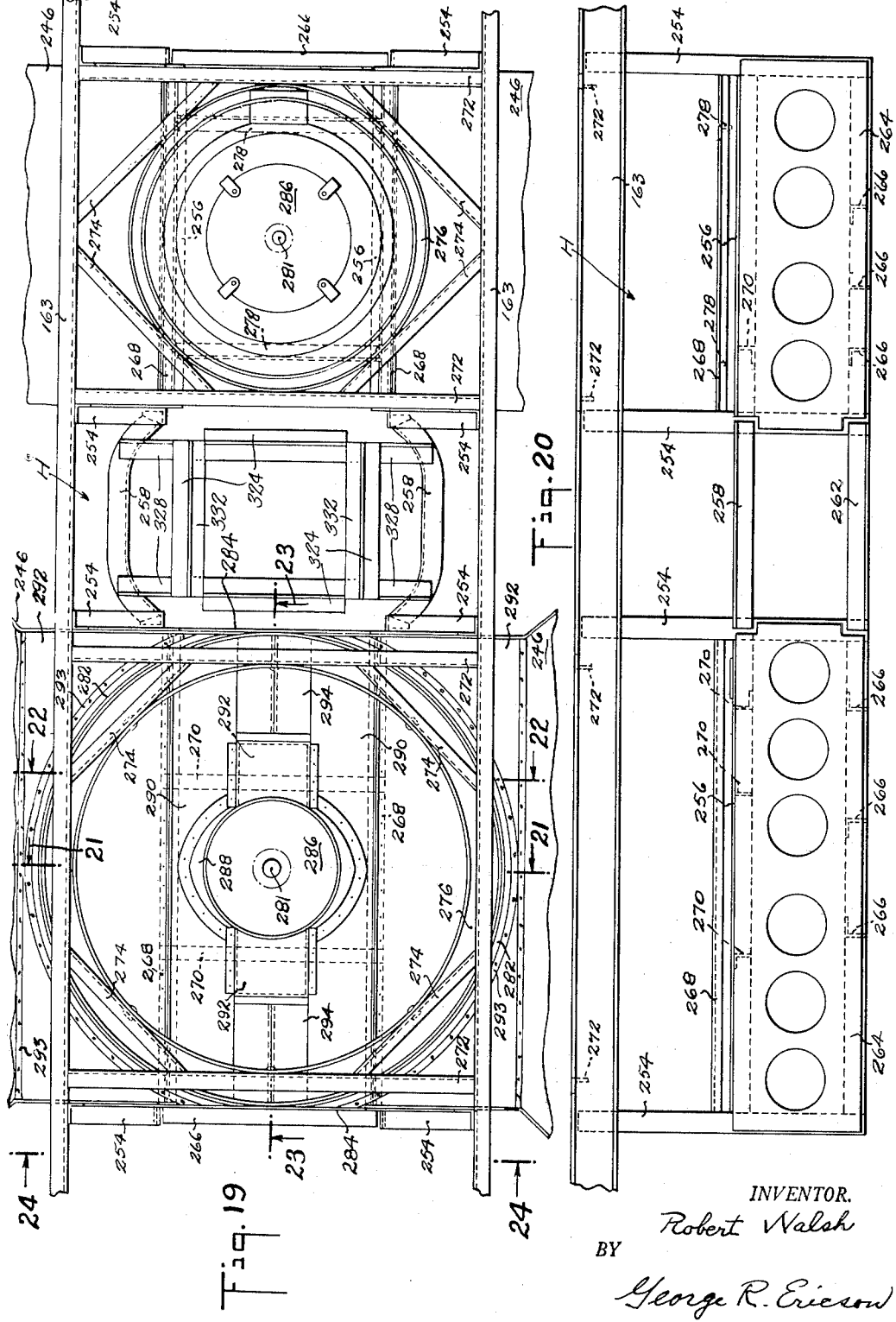

Oct. 4, 1955 R. WALSH 2,719,487
LOCOMOTIVE FRAMING FOR SUPPORTING VENTILATION SYSTEM
Original Filed Sept. 2, 1949 16 Sheets-Sheet 13
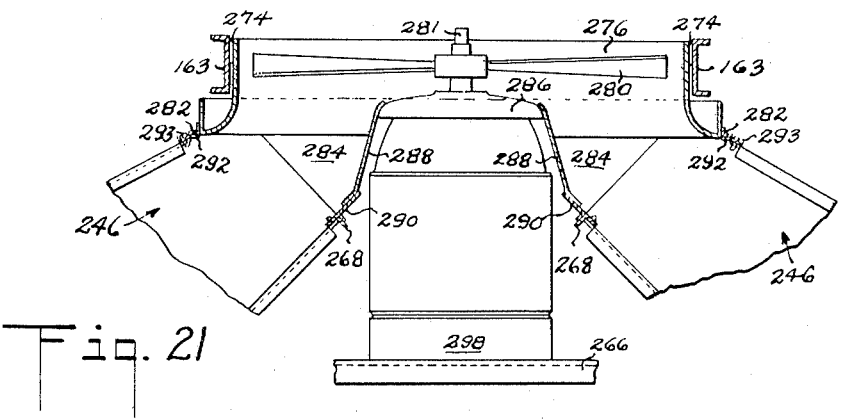
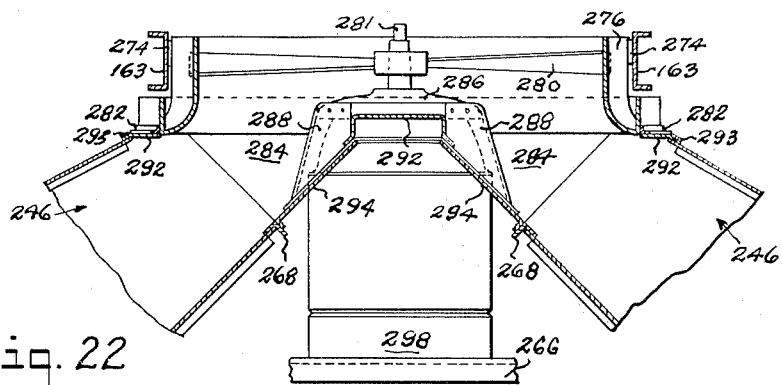
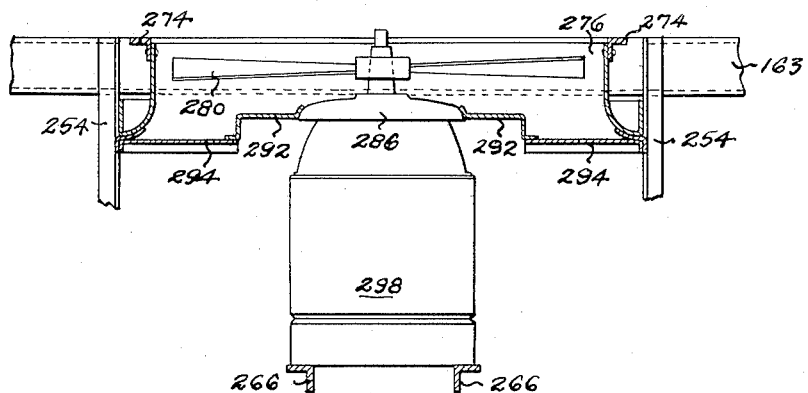
INVENTOR.
Robert Walsh
BY
George R. Ericson
ATTORNEY

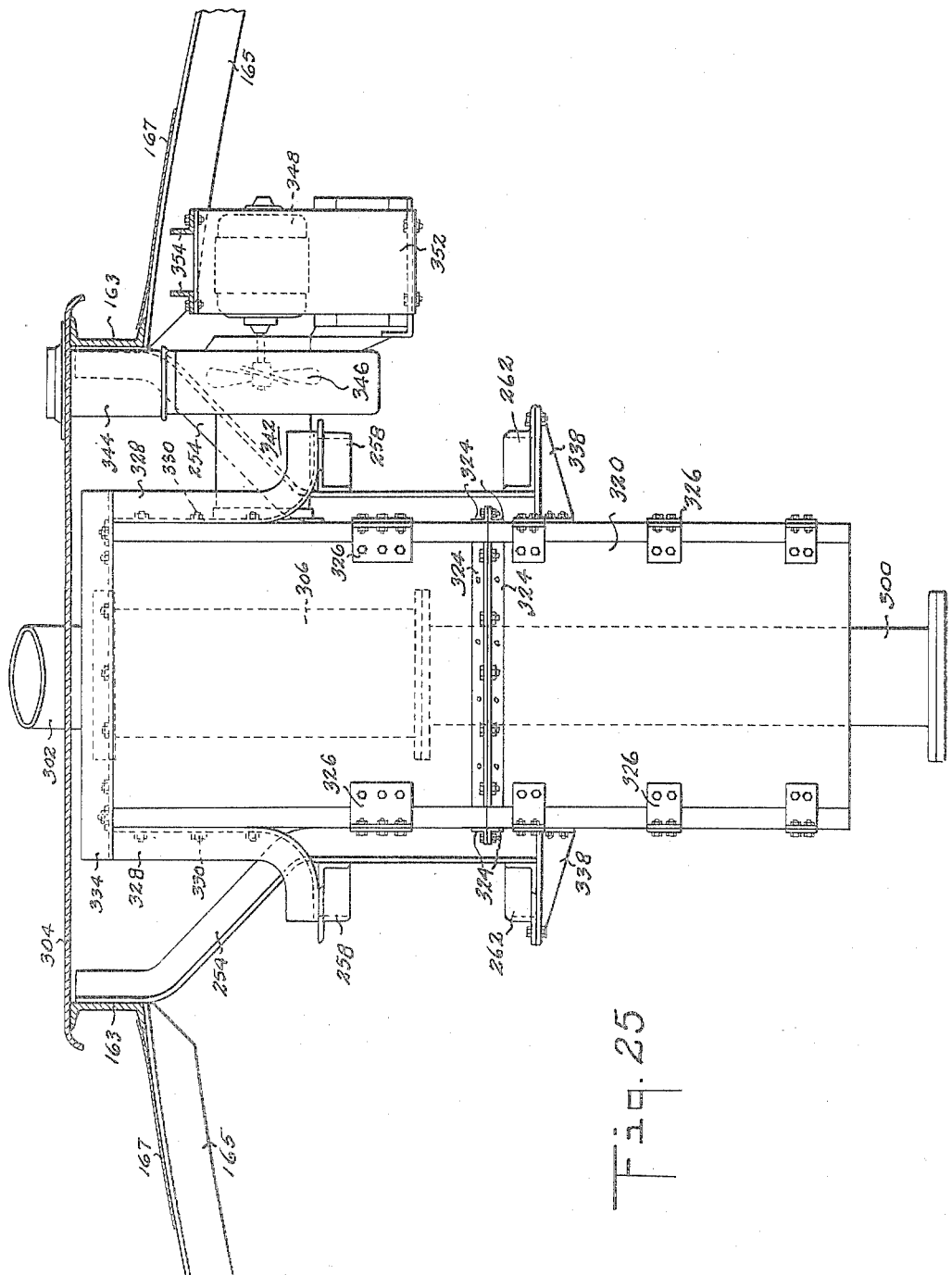

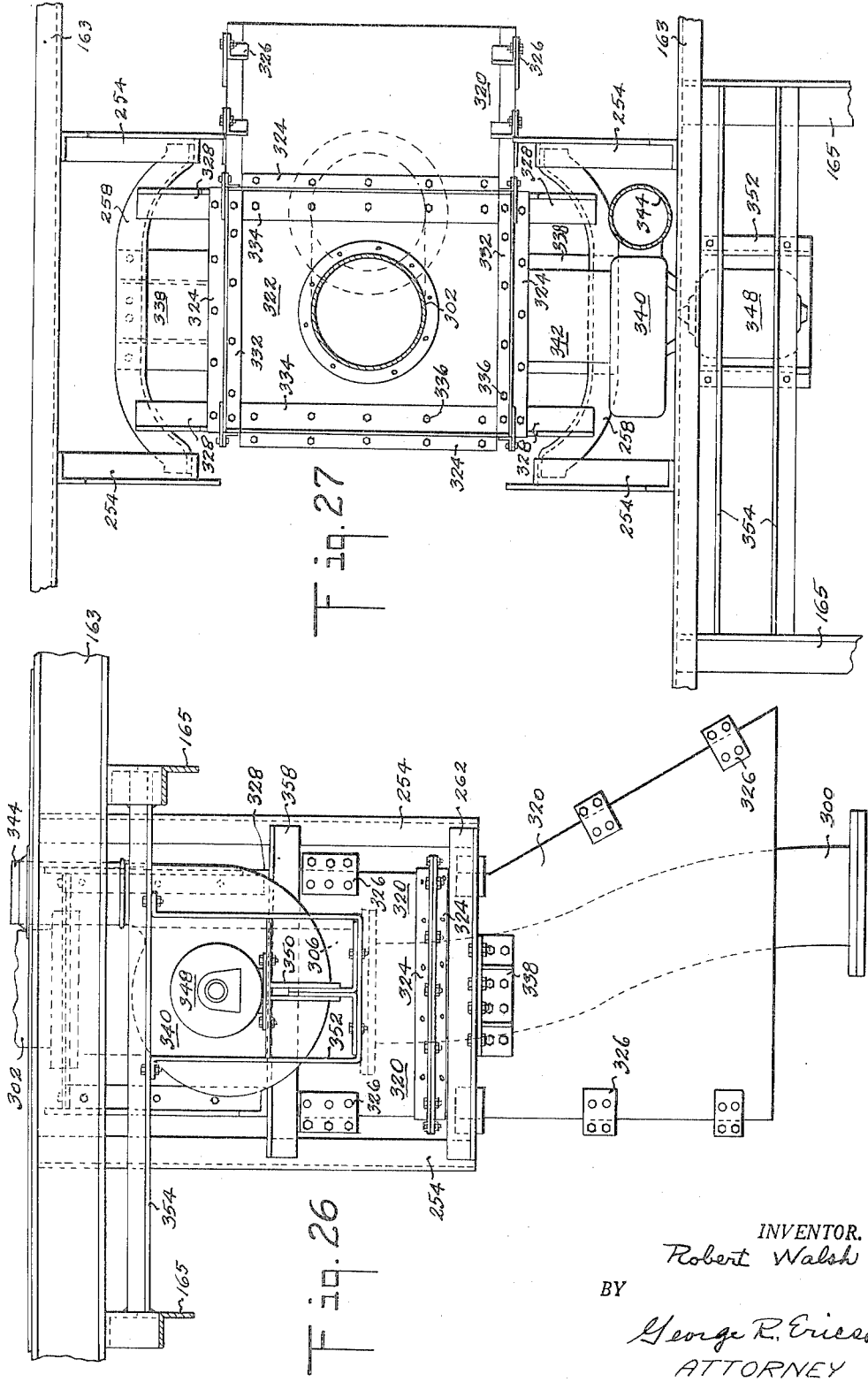

United States Patent Office 2,719,487
Patented Oct. 4, 1955

2,719,487
LOCOMOTIVE FRAMING FOR SUPPORTING VENTILATION SYSTEM

Robert Walsh, New York, N. Y., assignor to American Car and Foundry Company, New York, N. Y., a corporation of New Jersey Original application September 2, 1949, Serial No. 113,727. Divided and this application January 13, 1951, Serial No. 205,886

5 Claims. (Cl. 105—35)

This invention relates to railway locomotives and more particularly to the ventilation of locomotives of the diesel engine-electric type. This application is a division of my application Serial No. 113,727 filed September 2, 1949.

An object of the invention is to provide improved locomotive structure in which the interior will be adequately ventilated.

Another object of the invention is to provide a locomotive with improved structure for adequately cooling the power plants.

A further object of the invention resides in mounting structure carried by the locomotive side posts for supporting radiators in a water cooling system for internal combustion engines.

Another object of the invention resides in side frame construction in which tiers of openings are provided for ventilating the locomotive, for transferring heat from the water cooling systems of the power units and for exterior access to the electric control chamber and batteries.

A further object of the invention resides in the arrangement of air ducts, for transferring heat from radiators in water cooling system for locomotive power units, transversely of the associated units and the framing structure for supporting the ducts and fan systems.

These and other objects of the invention will be apparent to those skilled in the art from a study of the following description and accompanying drawings, in which:

Fig. 1 is a plan view of the interior of the locomotive showing the arrangement of power units and accessories therein.

Fig. 2 is a side view of the interior of the locomotive showing the general arrangement of power units and accessories therein.

Fig. 3 is a side elevational view of the locomotive.

Fig. 7 is a fragmentary sectional view of one side of the locomotive taken on line 7—7 of Fig. 3.

Fig. 8 is a fragmentary elevational view of the side frame showing the removable door post structure.

Fig. 9 is a sectional view of one of the side posts and radiator mountings taken on line 9—9 of Fig. 17.

Fig. 10 is a sectional view of the side frame taken on line 10—10 of Fig. 17.

Fig. 11 is a side elevational view of one of the locomotive side frames.

Fig. 12 is a top plan view of the top of the rear end of a side frame.

Fig. 13 is a sectional view of the side frame taken on line 13—13 of Fig. 11.

Fig. 14 is a sectional view of the side frame taken on line 14—14 of Fig. 11.

Fig. 15 is a sectional view of the locomotive taken on line 15—15 of Fig. 3.

Fig. 16 is a sectional view taken on line 16—16 of Fig. 17.

Fig. 17 is a fragmentary elevational view of a portion of one side frame with the roof plate removed and shutter casings installed.

Fig. 19 is a plan view of the supporting frame shown in Fig. 18.

Fig. 20 is a side elevation of the frame shown in Fig. 19.

Fig. 21 is a sectional view taken on line 21—21 of Fig. 19.

Fig. 22 is a sectional view taken on line 22—22 of Fig. 19.

Fig. 23 is a sectional view taken on line 23—23 of Fig. 19.

Fig. 25 is an end elevation of a main engine exhaust pipe cooling system taken on line 25—25 of Fig. 2.

Fig. 26 is a side elevation of the exhaust pipe cooling system shown in Fig. 25.

Fig. 27 is a plan view of the exhaust pipe cooling system shown in Fig. 25 with the roof cover removed.

Figure 4:
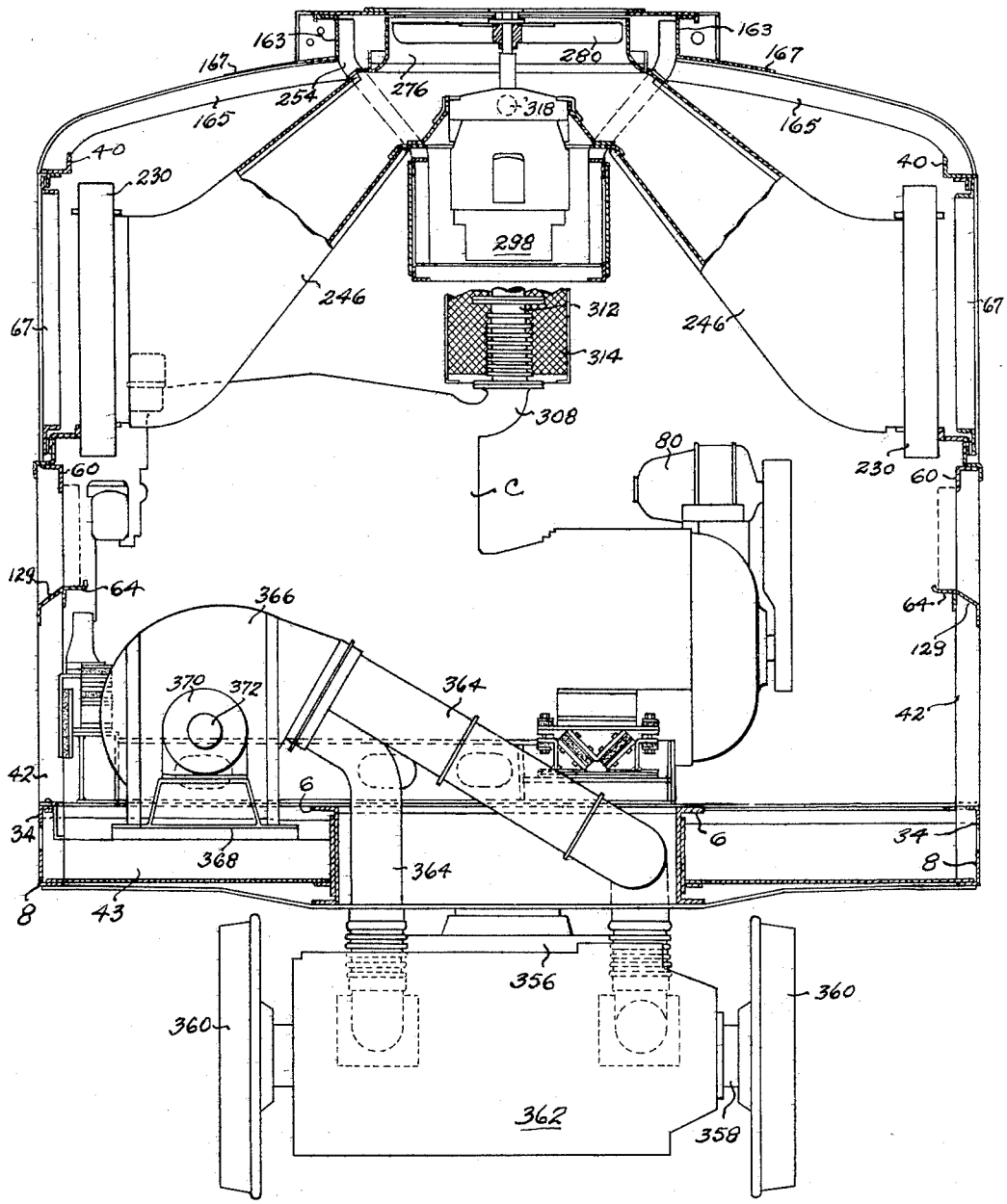
Fig. 4 is a sectional view of the locomotive taken on line 4—4 of Fig. 1.
Figure 5:
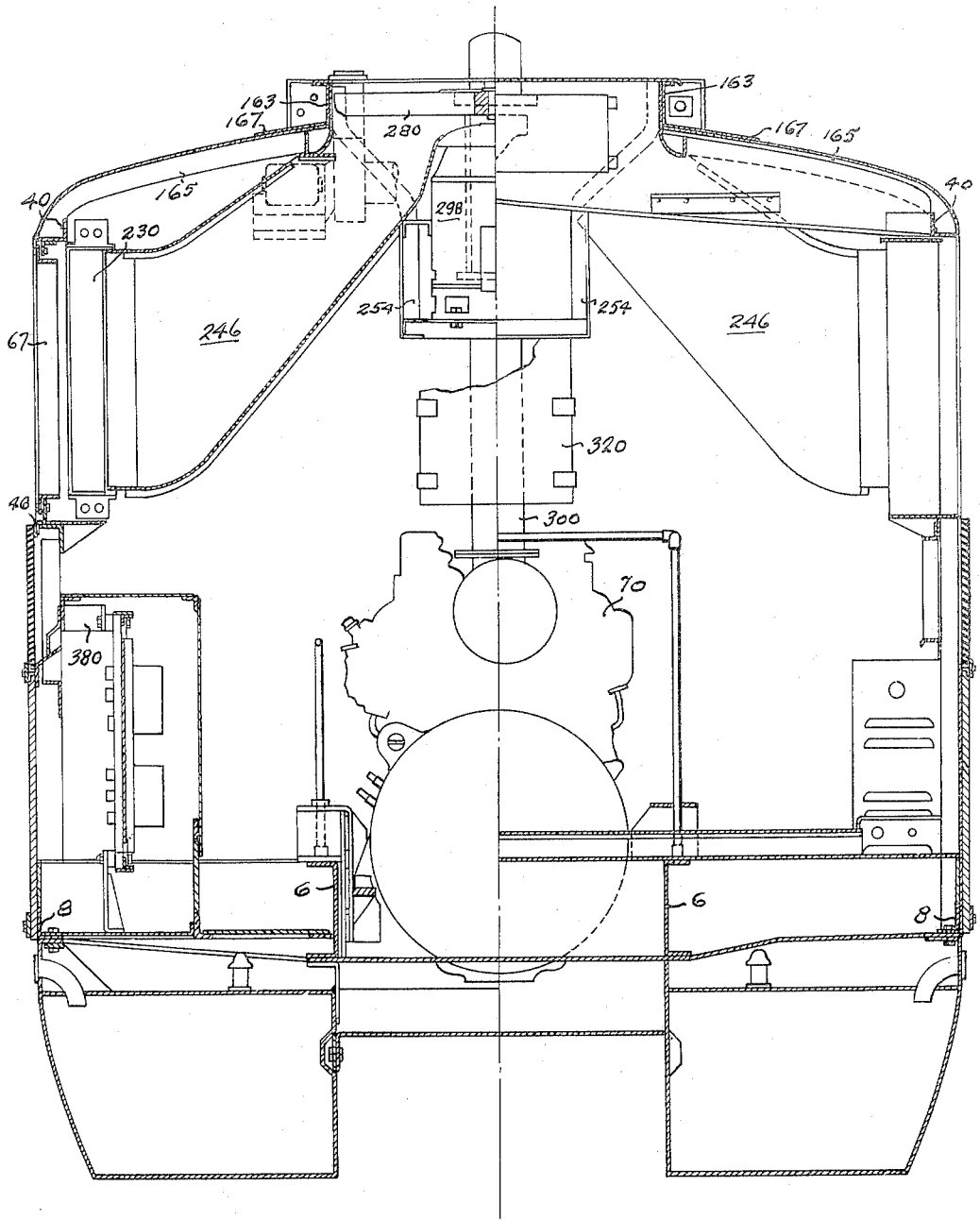
Fig. 5 is a sectional view of the locomotive taken on line 5—5 of Fig. 1.

The reference numeral 2 indicates the underframe of the locomotive on which is mounted similar side frames 4 and end frames 3 and 5 (Fig. 11). The underframe includes U-shaped center sill members 6 extending the full length thereof, angle side sills 8, rear channel sill 10 and curved front channel sill 12. The rear legs of the front sill are welded to the forward ends of the side sills, the rear ends of the side sills are welded to the rear sill and the ends of the center sills are welded to the front and rear sills. Similar bolster structures 14 and 16 extend transversely of the underframe and are secured to the side frames and center sill members. Cross bearer 18 extends transversely of the underframe, centrally between the bolsters, and is secured to the side sills and underframe members.

As previously stated, the side frame structures 4 are similar and references may be had to Figs. 7, 8, 9 through 14, 16 and 17 for details of the same. Numeral 38 indicates the rear end post in advance of which are side posts 42, door posts 44 and 50 and front posts 51' and 51". Posts 42 and 44 are continuous and are assembled with the base portions to the outside and their lower ends inside of the vertical flange of the side sill 8, the adjacent portions of such posts and side sill being welded together. Front posts 51' and 51" are welded to the front sill 12. Roof side angle plate 40 is secured on the top of the end post and posts 42, 44 and 51' and 51", the base flange of the side roof plate and the adjacent post ends being welded together. Angle brace 46' extends beneath the roof plate between front posts 42 and 44 and is welded to such members.

Door post 50 has a rearwardly extending horizontal leg or brace member 51 welded thereto and such unit is detachably secured in the side frame. Upper and lower brackets 52 and 53 are welded to the ends of post 50 and bracket 54 is welded to the rear end of member 51. The upper bracket 52 is secured to the brace member 46' by bolts 55, the lower bracket is secured on top of the front end sill 12 by bolts 56 and bracket 54 is secured to the adjacent side post 42 by bolts 57. One of the detachable door post structures must be removed when moving the front auxiliary power plant endwise from the locomotive to provide sufficient clearance.

Sectional side posts are assembled between some of the side posts and each comprises a lower section 58 and an upper section 59. Sections 58 are U-shaped in cross section and the base portions thereof lie inside the vertical flange of the side sill and rest on the horizontal portion of the side sills, the base portions of the posts being welded to the side sills. Sections 59 are also U-shaped in cross section but of less width and greater depth than sections 58 and are located inwardly thereof. An angle belt rail 60 extends longitudinally from a rear post 44 to front post 42 and is welded thereto at its ends. This belt rail lies over the tops of post sections 58 and the top flange is cut out to receive posts 42 and 66. Filler plates 62 are welded inside of the inner flanges of the posts 42 adjacent the belt rail. Post sections 59 have a base member 63 and a top member 103 welded between their parallel flanges, such members projecting outside of the post sections. The lower ends of the parallel flanges of post sections 59 project below the base members and above the roof plate and are welded to the inner faces thereof. The upper ends of post sections 59 lie adjacent the inside of the inner face of roof plate 40 and are welded thereto. Top members 103 project under and are welded to roof plate 40 and bottom member 63 overlies rail 60 and is welded thereto.

Posts 42 have radiator supporting plates 105 fixed outside of their flanges and extent inwardly approximately the same distance as and parallel to the flanges of post sections 59, see Fig. 7. The lower ends of plates 105 are formed to rest on the inner top face and against the upper rear face of the belt rail 60 to which they are welded. The upper ends of such plates lie inside of the roof plate and are welded thereto.

Longitudinal brace members 95 are welded to end post 38, and the adjacent post 42 and between such post 42 and the rear post 44. Horizontal brace members 97 and 99 extend between front posts 44 and 51' and are welded thereto and to post 51". A top door frame member 101 is welded between rear posts 44. An intermediate belt rail 64 lies between belt rail 60 and the side sill and is welded to the inner edges of the flanges of posts 42, 66 and 58. Bracket strips 46 extend between posts 42 in front of and above the belt rail 60 and are welded to such rail and posts. Bracket strips 46 also extend between front and rear posts 42 and adjacent posts 66 over the belt rail 60 and are welded thereto, the bracket strips having their ends cut away to clear the sides of the posts 42. Truss angle members 65 extend from the base portions of post sections 58 to the belt rail adjacent posts 42, from rear post 44 to post 42 in advance thereof and from the front post 42 to post 42 therebehind. Members 65 are welded to the side sill, belt rails and adjacent posts. Side posts 66, in advance of rear post 44 and to the rear of front post 42, extend between and are welded to belt rails 64 and 60 and roof plate 40.

The spaces between the roof plate, belt rail 60 and posts 42, above post sections 58, provide inlet openings through which air passes to the water cooling systems for the engines of the main power units. Frames formed of welded together angle members 67 carrying shutters 68 are arranged in such air inlet spaces and are secured by bolts 67' to depending brackets 69 welded to the roof plate, bracket plates 46 and brackets 41 welded to the sides of posts 42. Similar shutter carrying frames are arranged and similarly secured in end spaces above the belt rail 60 adjacent the spaces between post 66 and adjacent post 42. These frames 67 provide inlets through which air flows to the water cooling systems of the auxiliary and main power plants.

The spaces between belt rail 60 and rail 64 therebelow form openings through which ventilating air flows to the interior of the locomotive power chamber. Louvre panels 109 extend outside of the spaces. A frame member 113 extends around the edge portion of each panel and bolts 111 secure the panels and frames to bracket 46, the side posts and brackets 129 welded at their rear edges to belt rail sections 64. Filter sheets 121 are secured across the air openings through the side frame above brackets 129 and such sheets are carried by frames 127 suitably secured to the side frame.

Roof plate 161 extends over and is welded to front posts 51', see Fig. 11. Purlines 163 extend lengthwise of the locomotive and carlines 165 connect the purlines and the roof plates 40. A suitable sheet cover 167 is secured over the roof and end frames. Door 394 is hinged to forward post 44 to close the opening between such post and post 50. Panels 396 enclose the spaces between end post 38 and rear post 44 and between rear posts 44, such panels being detachably secured to the posts and to members 34 and 69. Panels 400 close the space between posts 66 and the adjacent posts 42 and 44, and removable panel 402 closes the space between front post 42 and post 66 (Figs. 3, 11).

Two similar traction power plants A and B are arranged in longitudinal alignment on the longitudinal center line of the locomotive power compartment. Two similar auxiliary power plants C and D are arranged adjacent the remote ends of the traction power plants with their longitudinal center lines extending transversely of the locomotive. The traction power plants are unitary structures and each includes a multi-cylinder diesel engine 70, a main generator 72 at one end and a main generator exciter and battery charging generator 74. The auxiliary power plants are unitary structures and each includes a multi-cylinder diesel engine 76, an alternator 78 at one end of the engine and an alternator exciter 80.

The engines are of the water cooled type and the water temperature is maintained in some predetermined temperature range by a cooling system including pipes 228' connecting the engines with radiators 230 supported from the side frame posts behind the shutter frames 69 as shown in Fig. 7. There are two radiators on each side of the locomotive for each of the traction power engine cooling systems and one radiator on each side of the locomotive for each auxiliary power engine cooling system. The radiators are located transversely in line with their associated engines and hence there is maximum cooling efficiency because of minimum piping length in the cooling systems.

Bolts 232 secure the top and bottom of the radiators to plates 105 projecting from posts 42 and to the flanges of post sections 59. Shims 234 are arranged between the flanges of posts 59 and the radiators associated therewith, while shims 236 are arranged between plates 105 on posts 42 and the associated radiators. Rubber bumper strips 238 are secured to the roof flange 40 and engage the upper ends of the radiators. The lower outer ends of the radiators are engaged by bottom sealing strips 240 attached to brackets 242 secured to the brackets 46 by the bolts securing the lower run of the shutter frames in position, see Fig. 7.

Neck flanges 244 secured to the radiators extend inwardly from the inner side of the radiators to the inlet end of transversely extending air duct structures 246 having their inlet ends formed with flanges 248 interfitting with flanges 244 and secured therewith by screws 252. The outlet ends of the ducts are supported by a pair of similar ceiling frame structures H, the front one of which is shown in detail in Figs. 18 to 20 inclusive.

Each frame H includes depending side hanger members 254 secured at their upper ends to purlines 163. These members have an angularly extending intermediate portion, such portions on opposite sides of the frame angling downwardly toward each other, connected along each side by rails 256 and 258 at the lower end of the angle. Bottom members 260 and 262 connect the bottom ends of the hangers along each side of the frame. The spaces between the end hangers are closed by apertured plates 264 welded to frame members 254, 256 and 260. Cross members 266 extend between and are welded to opposite hanger members 260. Angularly disposed longitudinal members 268 extend between and are welded to hangers 254 slightly above members 256 and transverse members 270 extend transversely between and are welded at their ends to opposite members 256. Top transverse members 272 are welded to the purlines 163. Transverse members 278 extend between and are welded to opposite members 268 at the right end of frame H as viewed in Fig. 18. Members 274 extend between and are welded to adjacent faces of members 272 and purlines 163 and circular outlet members 276 are secured to members 272 and 274. Blowers 280 and their shafts 281 are mounted within the circular outlet members 276. Semi-circular angle members 282 are fixed around the lower outer portion of the circular outlet members and depending ring plates 292 are secured to the under face of members 282.

Figure 18:
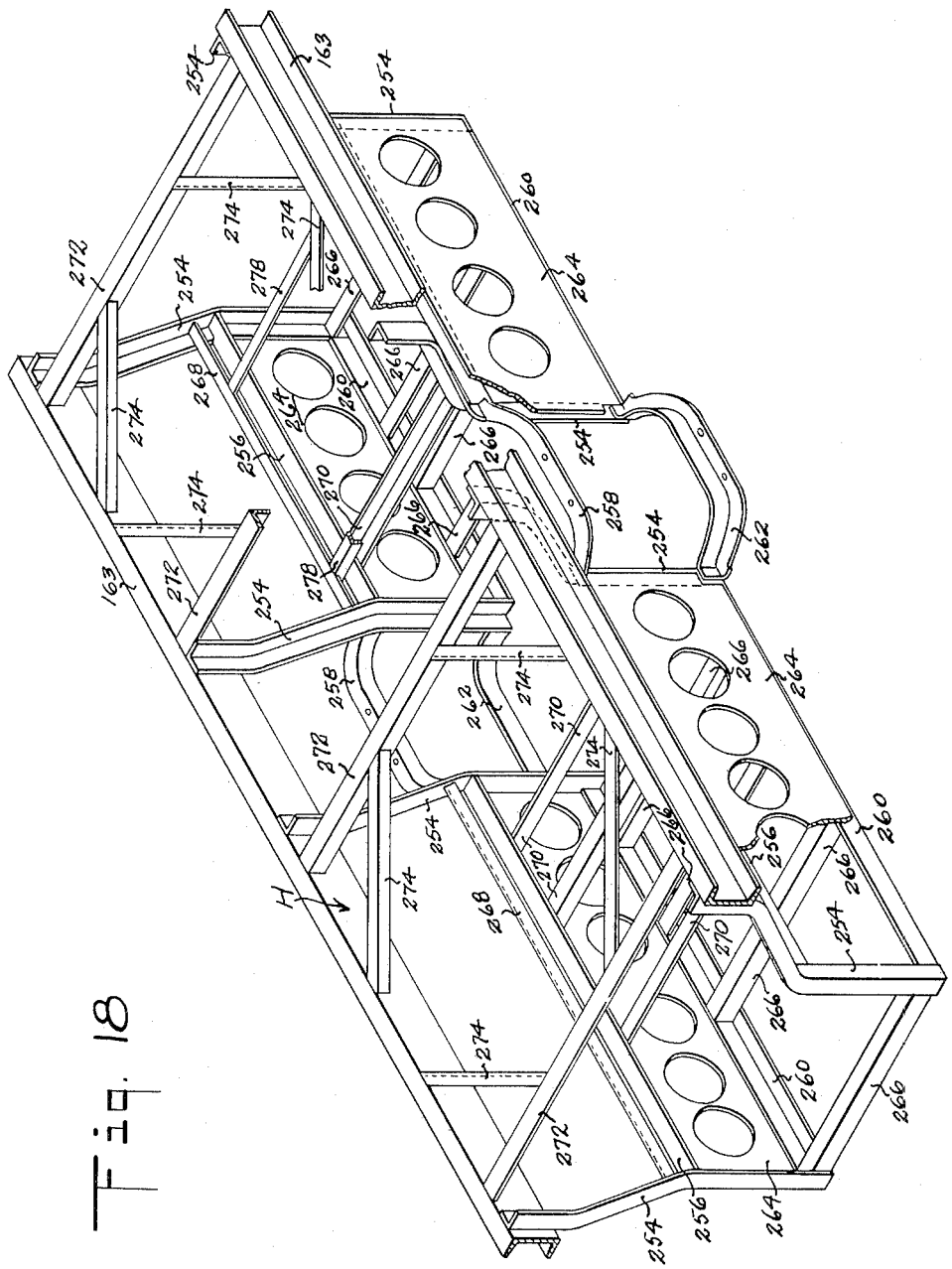
Fig. 18 is a perspective view of a portion of the supporting frame for the blowers and air ducts in the engine water cooling systems and exhaust pipe cooling system.
Figure 24:
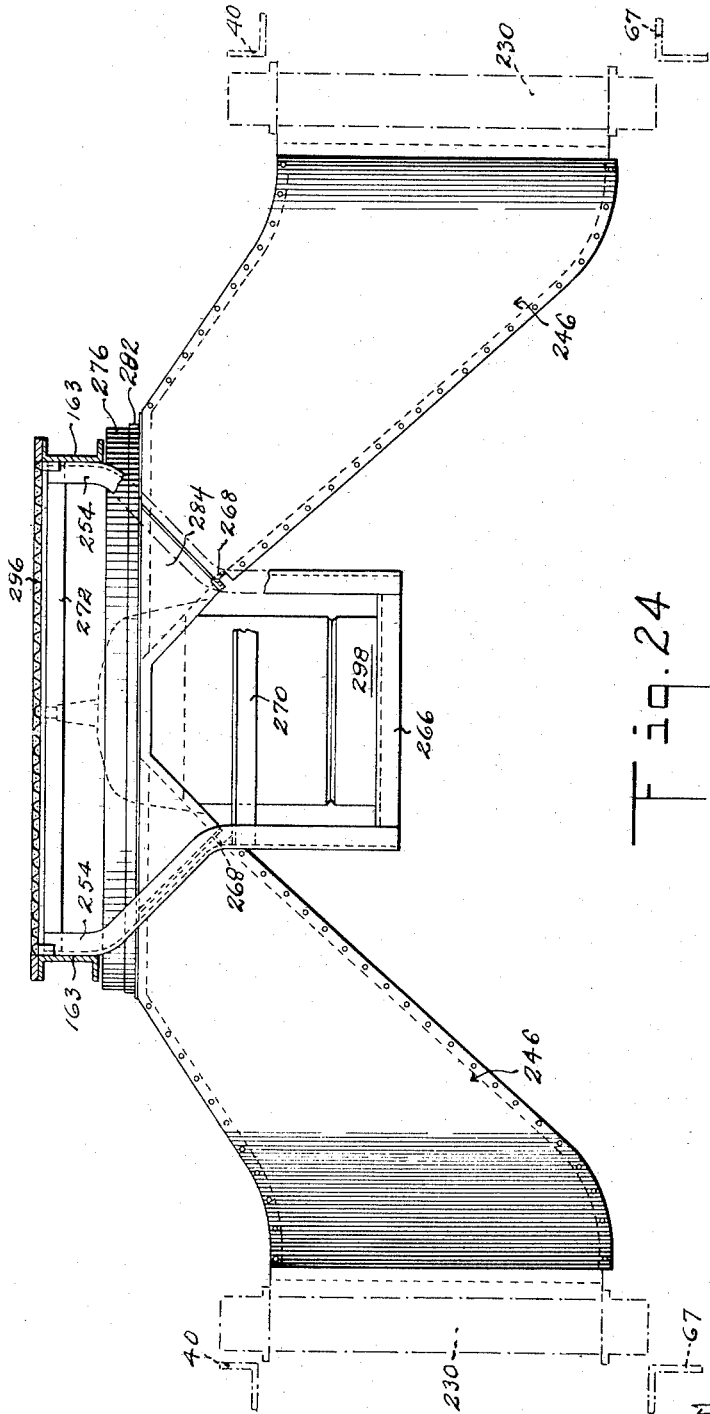
Fig. 24 is a sectional view taken on line 24—24 of Fig. 19.

The outlet ends of the rectangular air ducts 246 for the water cooling system of the engine in power unit B lead to the opposite openings between hangers 254, purlines 163 and side rail members 268 at the left end of Fig. 18. Duct structures 246 for the water cooling system of the engine in power unit D lead to opposite openings between hangers 254, purlines 163 and side rail members 268 at the right end of Fig. 18. The bottom walls of the ducts underlie angle frame members 268 and are suitably secured thereto. The upper walls of the ducts underlie downturned flanges on plates 292 secured to the undersurface of semi-circular angle members 282. Suitable fastening means secure the ends of the top duct walls between strips 293 and the flanges of plates 292. The side walls of the ducts continue inwardly until they intersect the members 293 and between the ends of the duct side walls closure plates 284 are applied. Closure plates 290 are secured on frame members 268 and form continuations of the bottom walls of the ducts. Closures 290 and 268 are suitably secured together along their adjacent edges. Cap 286, through which shaft 281 projects, is fixed above electric motor 298 and carries spaced shrouds 288 having end flanges secured on plates 290. Closing the spaces between the shrouds and fixed to plates 290 are the flat plates 292 and plates 294. In this manner, the ducts for the traction engine cooling system are connected in leak proof relation with the ring outlet member 276. Screen 296 is fixed over the top of outlet ring member 276. The ducts 246 for the auxiliary power unit engine cooling system are secured to the radiators and frame H in substantially the same manner as just described.

The electric motor 298 is detachably mounted on the supporting frame members 266 and is held steady between two of members 270. Cap 292 is fixed to the top of the motor.

The exhaust from the Diesel engines of the traction power units A and B passes out through the roof of the locomotive and as such engines are of the high speed automotive type, the exhaust piping temperature may become as high as 1500° F. In order to eliminate fire hazard, as well as safety to the locomotive engineers, a cooling system is provided for the exhaust piping of each engine A and B and also for th exhaust piping of engines in units C and D.

The exhaust pipings for traction power engines A and B are similar and consist of detachable sections including a rigid base pipe 300 fixed to the engine in connection with the exhaust manifold, a rigid top pipe 302 extending through roof 304 and a flexible demountable intermediate pipe 306. These pipings extend upwardly through spaces between members 258 and 262 of the frames H.

The exhaust pipings for the engines of the auxiliary power units C and D are similar and air cooled. Each consist of detachable sections including a rigid base member 308 fixed to an auxiliary engine in connection with the exhaust manifold, a rigid top muffler unit 310 extending through roof 304 and a flexible demountable intermediate member 312. A semi-circular screen 314 is fixed around section 312 to shield the same so that the hot exhaust piping cannot be grasped by an operator or person passing by the engine. A skirt housing 316 surrounds exhaust piping above the flexible section and is spaced therefrom to allow cooling air to flow upwardly in the space. A pipe 318 leads from the skirt to the adjacent duct 246 of the water cooling system of the associated engine, see Fig. 2, and the fan therein will pull the air upwardly from within the locomotive through skirt 316, pipe 318, duct 246 and ring 276 through the car roof.

The exhaust pipings for the traction engines are encased and air cooled in a similar manner. The major portion of piping section 300 and the flexible section 306 are surrounded by fibre board casings comprising skirt walls 320 and top wall 322. Each wall is formed in two sections having adjacent flanges 324 bolted together. The skirt walls have brackets 326 fixed thereto and the brackets along adjacent edges of the walls are bolted together. The skirt walls are spaced from the exhaust piping so that air can flow therebetween.

Upper frame H is utilized for supporting the casing, see Figs. 20, and 25 to 27 inclusive. A pair of hangers 328 along each side wall of the casing have feet secured on frame members 258, the walls being secured to the hangers by bolts 330. Angle members 334 extend across and are welded to the top of each pair of hangers and straps 332 extend between the angle members and are secured thereto. The hangers, angle members and straps provide a supporting frame for the casing, the top of which is secured to the angle members and straps by bolts 336. Brackets 338 are secured to the underside of frame members 262 and are bolted to the adjacent walls of the lower skirt section of the casing. The bottom section of the casing can be removed by unbolting flanges 324 and brackets 338 so that access can be had to disconnect piping section 300 from section 306 when desired, as for example when dropping the engine through the underframe.

The air exhausting system for the casing consists of housing 340 having an inlet pipe 342, secured to and in communication with the casing, and an outlet pipe 344 projecting through roof 304. The casing contains blower 346 driven by electric motor 348. The casing unit is mounted on a stand 350 fixed in U-shaped hanger 352 secured at its upper ends to angle members 354.

The underframe is mounted on trucks 356 carrying axles 358 on which wheels 360 are mounted. Each axle has an electric motor 362 associated in driving relation therewith, the motors being suitably mounted on the trucks.

An air cooling system is provided for the motors on each truck and conduits 364 lead from blower casing 366 to the motors. Supporting frame 368, mounted on a pan member 43, carries the blower casing and also electric motor 370 for driving blower shaft 372 that extends into the casing, see Fig. 4.

Figure 6:
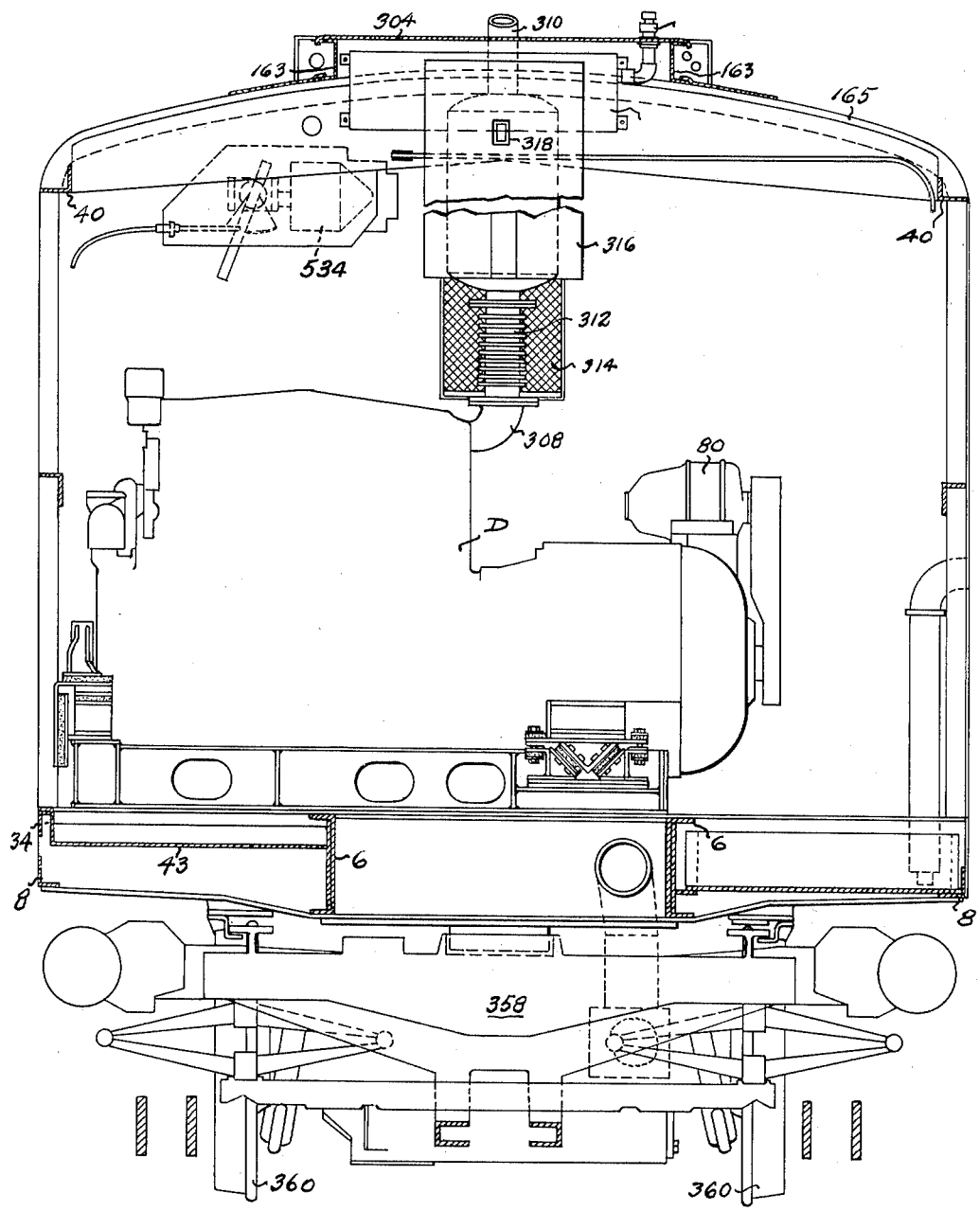
Fig. 6 is a sectional view of the locomotive taken on line 6—6 of Fig. 1.

The shutters 68 are fixed on rods 528 and arms 530 are fixed to and project inwardly from the rods, see Fig. 7. These arms are pivotally connected to actuator links 532 suitably connected to be actuated by motor 534, see Fig. 6, under the control of a thermostat responsive to engine water temperature whereby the motor will be rendered operative or inoperative to open or close the shutters to maintain a desired engine cooling water temperature.

The invention may be modified in various respects as will occur to those skilled in the art and the exclusive use of all modifications as come within the scope of the appended claims is contemplated.

What is claimed is:

1. In a locomotive, spaced roof purlines, spaced hangers depending from the purlines, spaced cross members secured to the purlines, support members secured to the end portions of the cross members and the adjacent purlines, an air outlet member in the space between the support members, means securing the outlet member to the support members, angular side rails secured to intermediate portions of the hangers, air duct structures for an engine radiator cooling system extending upwardly through opposite spaces bounded by the purlines, cross members and angular side rails, means securing the duct structures to the angular side rails, and means securing the upper ends of the duct structures to the outlet member.

2. In a locomotive, spaced roof purlines, spaced hangers depending from the purlines, spaced cross members secured to the purlines, support members secured to the end portions of the cross members and the adjacent purlines, an air outlet member in the space between the support members, means securing the outlet member to the support members, angular side rails secured to intermediate portions of the hangers, rectangular air duct structures for an engine radiator cooling system extending upwardly through opposite spaces bounded by the purlines, cross members and angular side rails, means securing the bottom walls of the duct structures to the angular side rails, means securing the upper ends of the top walls of the duct structures to the outlet member, and means sealing the upper ends of the duct members with said air outlet member.

3. In a locomotive, having radiators at opposite side walls for cooling water in an engine, spaced roof purlines, spaced hangers depending from the purlines, spaced cross members secured to the purlines, support members secured to the end portions of the cross members and the adjacent purlines, an air outlet collar in the space between the support members, means securing the outlet collar to the support members, angular side rails secured to intermediate portions of the hangers, air duct structures for an engine radiator cooling system extending upwardly from the radiators through opposite spaces bounded by the purlines, hangers and angular side rails, means securing the duct structures to the angular side rails, means securing the upper ends of the duct structures to the outlet collar, and means sealing the lower ends of the duct structures with the radiator.

4. In a locomotive having an engine exhaust conduit and air jacket, a carrier frame structure comprising spaced roof purlines, spaced side hangers having their upper ends secured to the purlines, bottom and intermediate side rails secured to the hangers, cross rails secured to opposite side rails, spaced upright supporting members secured on the intermediate side rails, said upright supporting members bounding a space through which the exhaust conduit and jacket extend, and means securing the jacket to the upright supporting members.

5. In a locomotive, spaced roof purlines, four spaced hangers depending from each purline, spaced cross members secured to the purlines adjacent the hangers, said hangers and cross members forming three aligned sections, supporting members in the end sections secured at their ends to the cross members and adjacent purlines, air outlet collars fixed to the supporting members in the end sections, side rails fixed to the bottom and intermediate portions of the hangers, cross members fixed to opposite side rails, upstanding support legs fixed on the upper side rails in the intermediate section, and engine exhaust casing supporting structure carried by said legs.

References Cited in the file of this patent

UNITED STATES PATENTS

| | | |
|---|---|---|
| 1,659,866 | Fornaco | Feb. 21, 1928 |
| 1,691,598 | Zbinden | Nov. 13, 1928 |
| 1,747,868 | Guernsey | Feb. 18, 1930 |
| 1,748,125 | Hall | Feb. 25, 1930 |
| 1,804,334 | Guernsey | May 5, 1931 |
| 1,843,548 | Fildes | Feb. 2, 1932 |
| 2,190,144 | Blomberg et al. | Feb. 13, 1940 |

FOREIGN PATENTS

| | | |
|---|---|---|
| 178,936 | Switzerland | Oct. 16, 1935 |